United States Patent
Shen et al.

(10) Patent No.: US 7,558,252 B2
(45) Date of Patent: **\*Jul. 7, 2009**

(54) COMPUTER-IMPLEMENTED VOICE MARKUP LANGUAGE-BASED SERVER

(76) Inventors: Liang Shen, 42 Page Avenue, North York, Ontario (CA) M2K 2B4; Umakanthan Shumaganathan, 1577 Lawrence Avenue West, #924, North York, Ontario (CA) M6L 1C4

( * ) Notice: Subject to any disclaimer, the term of this patent is extended or adjusted under 35 U.S.C. 154(b) by 349 days.

This patent is subject to a terminal disclaimer.

(21) Appl. No.: 11/366,122

(22) Filed: Mar. 2, 2006

(65) Prior Publication Data

US 2006/0159075 A1 Jul. 20, 2006

(51) Int. Cl.
*H04L 12/66* (2006.01)
(52) U.S. Cl. ...................... 370/352; 709/219
(58) Field of Classification Search ............... None
See application file for complete search history.

(56) References Cited

U.S. PATENT DOCUMENTS

| | | | | |
|---|---|---|---|---|
| 6,157,705 A | * | 12/2000 | Perrone | 379/88.01 |
| 6,320,857 B1 | * | 11/2001 | Tonnby et al. | 370/352 |
| 6,600,736 B1 | * | 7/2003 | Ball et al. | 370/352 |
| 6,813,278 B1 | * | 11/2004 | Swartz et al. | 370/466 |
| 6,910,074 B1 | * | 6/2005 | Amin et al. | 709/227 |
| 6,970,906 B1 | * | 11/2005 | Parsons et al. | 709/204 |
| 7,072,328 B2 | * | 7/2006 | Shen et al. | 370/352 |
| 7,095,733 B1 | * | 8/2006 | Yarlagadda et al. | 370/352 |

\* cited by examiner

*Primary Examiner*—Phirin Sam (57) ABSTRACT

A computer-implemented method and system for a telephony server to provide services based upon a call from a user. A user communicates with the telephony server over a telephone communication device. The telephony server retrieves a voice application over a computer network from a remote web site and uses it to have a speech-based conversation with the user. The conversation results in obtaining service data from the user. The retrieved voice application performs the requested service based upon the user-provided service data. After the requested service is performed, the voice application and the user service data are removed from the telephony server.

1 Claim, 12 Drawing Sheets

COMPUTER-IMPLEMENTED VOICE MARKUP LANGUAGE-BASED SERVER

BACKGROUND

1. Technical Field

The present invention is directed to Internet-based voice systems. More specifically, the present invention is directed to Internet-based voice systems that are used within computer server networks.

2. Description of Related Art

Telephone users are steadily increasing their demands for services that are accessible through their telephones. Telephone users want to access the range and types of services that they are accustomed to accessing over the Internet. Internet applications include for example content searching applications as provided by such companies as Yahoo or Infoseek. Other applications include address or phone number lookups.

The Internet provides users with visually-based interfaces to access the service applications. However, telephone users have difficulty in using Internet applications due to their devices not being adept to interacting with the visually-based interfaces of the Internet applications. For example, cell phone users have relatively small displays within which to view Internet information.

Telephony servers provide the computer software and hardware infrastructure for handling telephone calls over Internet networks. However, current telephony servers exhibit many disadvantages in processing telephone calls. An exemplary disadvantage is that many current telephony servers are limited in the range and flexibility of the services they offer. Such telephony servers have only a fixed number of applications to interact with the users.

This arises due to telephony servers typically relying upon "hard-wired" solutions where the telephony servers use only a pre-selected number of voice applications whose operational requirements are known beforehand. Limiting the pool of voice applications to a certain pre-selected number is an undesirable trait of the current telephony approaches. These disadvantages as well as others render current telephony systems less efficient and effective to service the needs of users.

SUMMARY

The present invention solves the aforementioned disadvantages as well as other disadvantages of the current telephony systems. In accordance with the teachings of the present invention, a novel telephony server provides services based upon a call from a user. A user communicates with the telephony server over a telephone communication device. The telephony server retrieves a voice application over a computer network from a remote web site and uses it to have a speech-based conversation with the user. The conversation results in obtaining service data from the user. The retrieved voice application performs the requested service based upon the user-provided service data. After the requested service is performed, the voice application and the user service data are removed from the telephony server.

DETAILED DESCRIPTION OF THE PREFERRED EMBODIMENT

Figure 1:
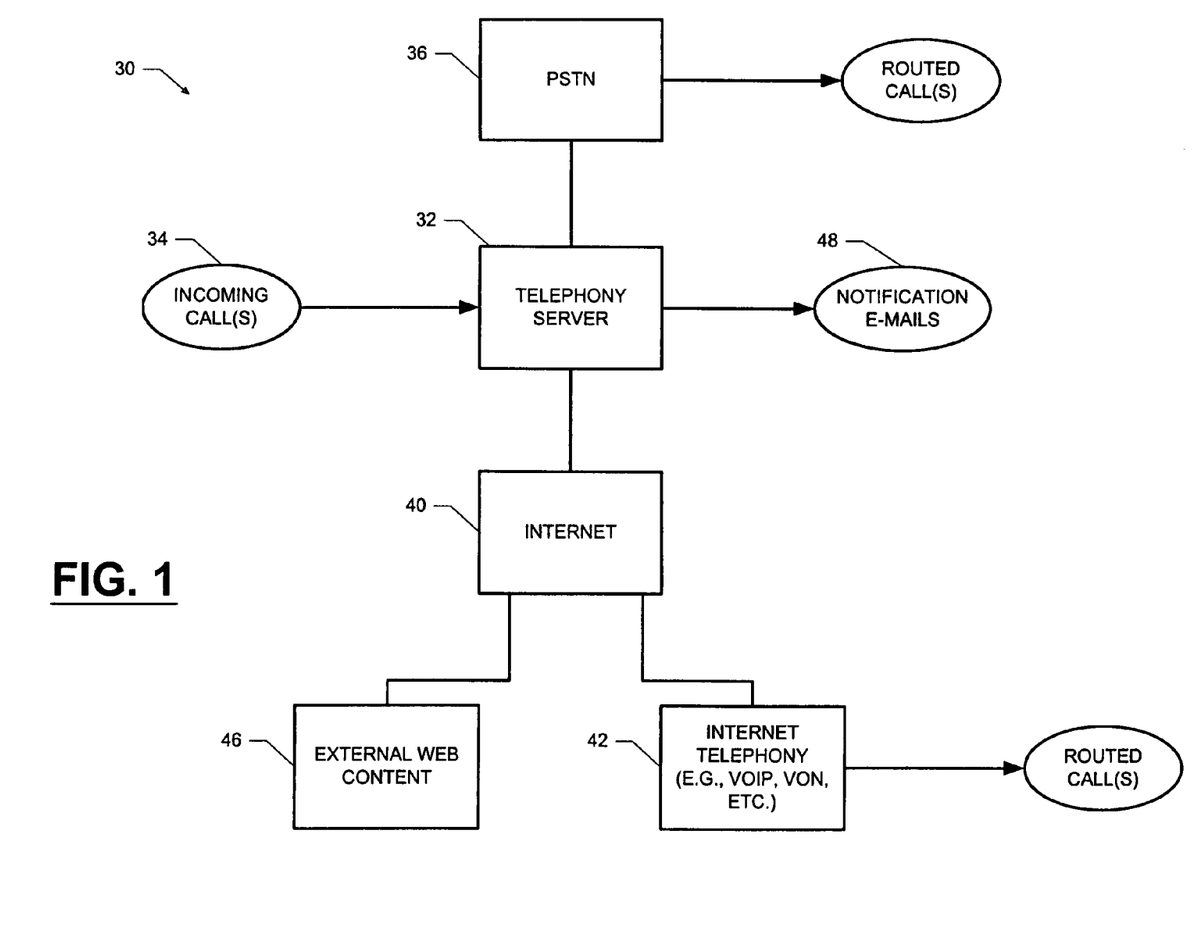
FIG. 1 is a block diagram that depicts the computer-implemented environment of the present invention.

FIG. 1 is a system block diagram that generally shows at 30 the computer-implemented components of the present invention. A telephony server 32 of the present invention processes incoming calls 34 so that a telephone conversation may occur between the person who placed the call and the desired call recipient. The telephony server 32 processes and routes the incoming calls 34 either through a PSTN (public switched telephone network) connection 36 and/or an Internet connection 40.

The telephony server 32 may select to route the call to the person through a PSTN connection 36 and/or Internet channel 40. The telephony server 32 may use a Voice Over IP (VoIP) product, a Voice on the Net (VON) product, or other such similar products to place the call over the Internet telephony channel 42. An example of a VoIP product is the VoIP product available from VocalTec Communications Ltd. located in Fort Lee, N.J. An example of a VON product is the VON product available from Intel located in Austin, Tex.

The telephony server 32 examines whether to use a PSTN connection 36 or an Internet connection 40 to route the call 34. The examination is based upon the location of the person with whom the user wishes to speak and a cost comparison between using an Internet connection 40 to make the call versus a PSTN connection 36. If the telephony server 32 decides not to use an Internet connection 40 to route the call 34, then the call 34 is routed through the PSTN connection 36, and the user communicates with the desired person through the PSTN connection 36.

If the telephony server 32 decides to use an Internet connection 40 to route the call 34, then the call 34 is routed through an Internet connection 40 to the remote location where the desired person is located. The telephony server 32 may also further examine whether to route the call 34 for a predetermined distance with the Internet connection 40, and then finish routing the call 34 through a PSTN connection 36. The decision may be based upon whether the PSTN connection 36 is less expensive to finish routing the call 34 to the desired person and whether the PSTN connection 36 is the only viable channel to complete the routing.

A user may also communicate with the telephony server 32 in order to request one or more services. For example, the user may call the telephony server 32 in order to locate a restaurant at which to dine. The incoming call 34 is received by the telephony server 32, and the telephony server 32 asks questions to the user in order to determine the type of service. The telephony server 32 recognizes the words of the user to obtain the parameters of the restaurant search to be conducted. If abnormal conditions are detected by the telephony server 32 during processing, then the telephony server 32 sends notification electronic mail messages 48 to the appropriate personnel so that the abnormal conditions can analyzed and remedied if needed.

The telephony server 32 may obtain external web content 46 to assist it in handling the service request. This includes the external web content 46 providing voice applications to interact with the user. The external web content 46 may also perform the searching needed to provide the service. For example, the telephony server 32 may send search criteria to a restaurant location web site so that the web site can determine restaurants that satisfy the search criteria.

Figure 2:
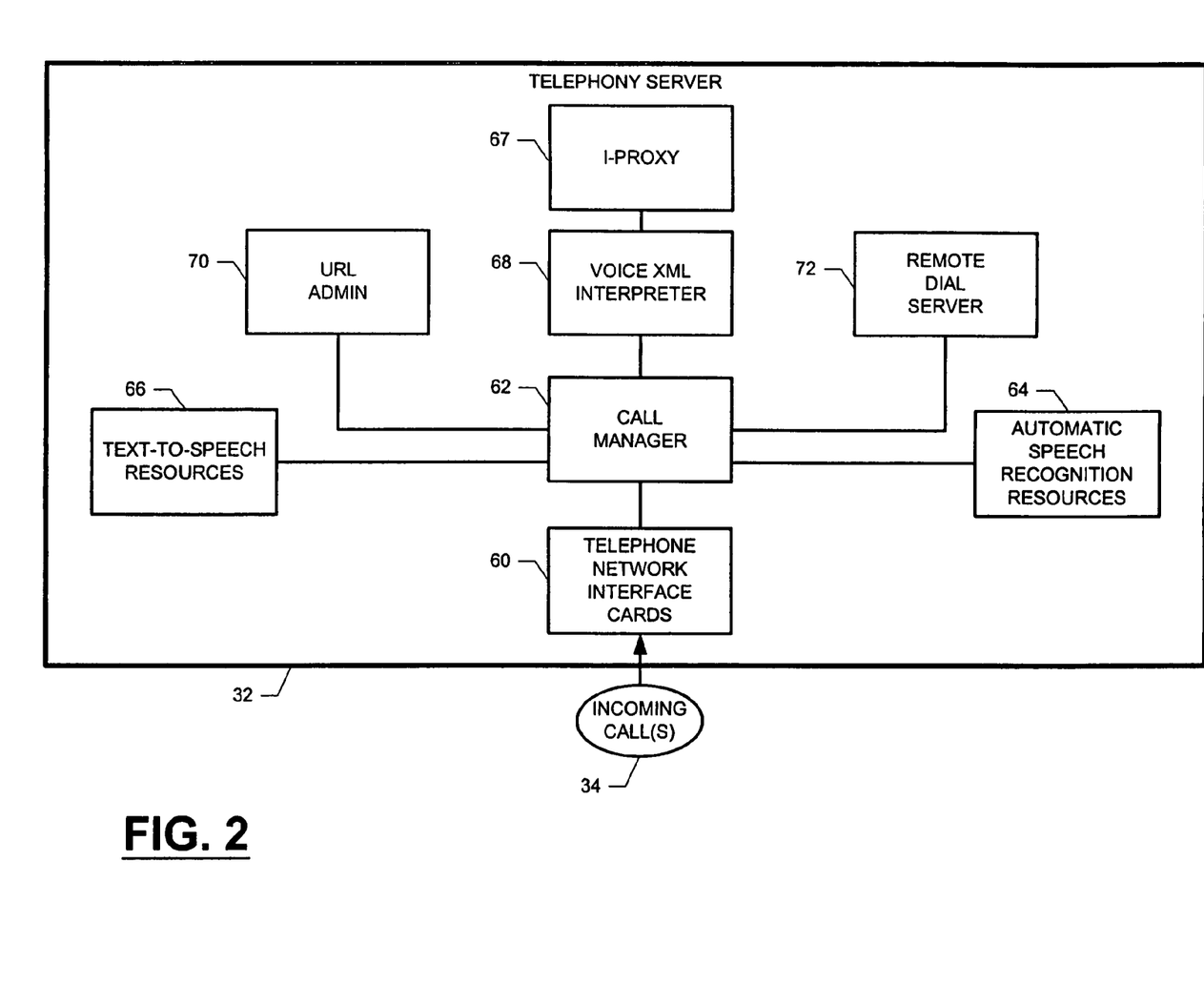
FIGS. 2 and 3 are block diagrams that depict the internal computer-implemented components of the present invention.
Figure 3:
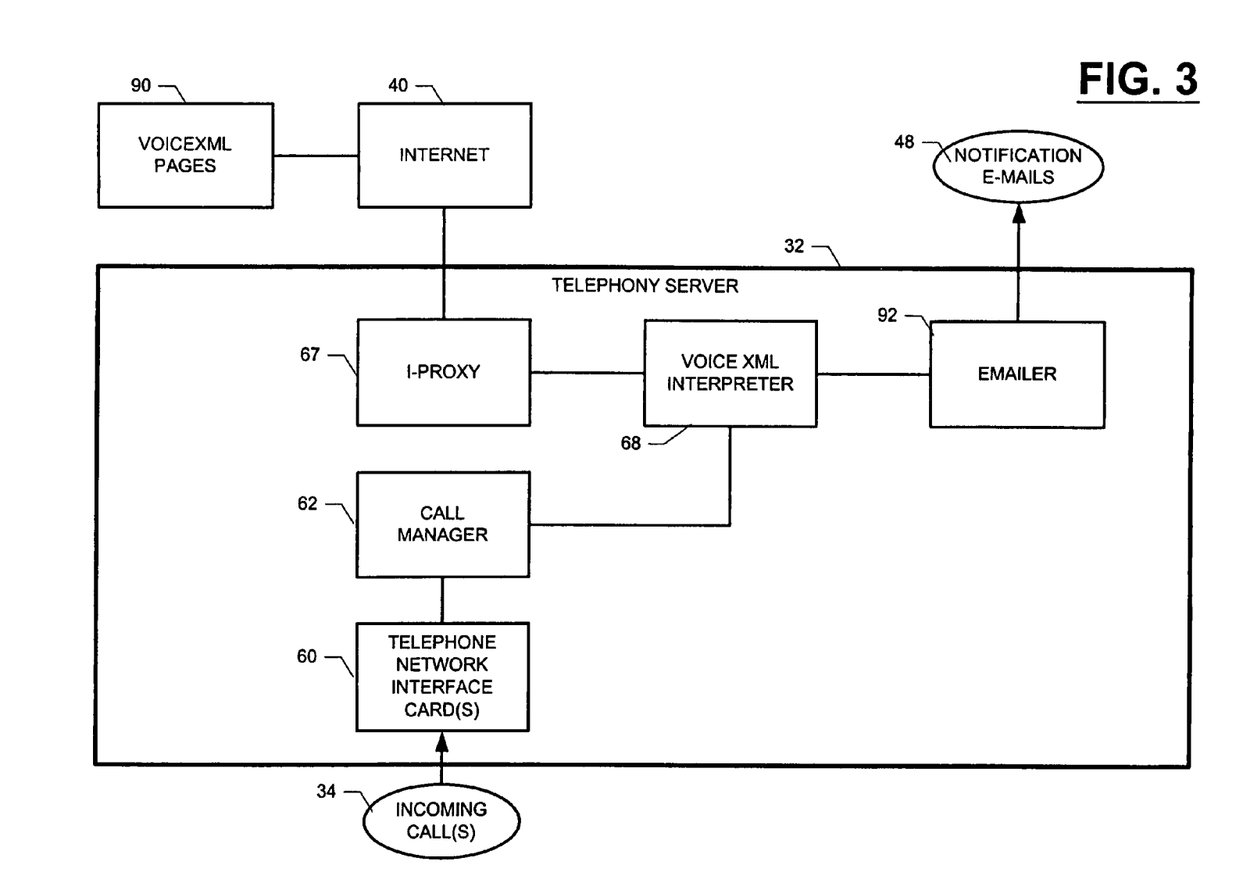

FIGS. 2 and 3 depict internal computer-implemented components of the present invention that handle service requests of a user. With reference to FIG. 2, the telephony server 32 utilizes a telephone network interface card 60 to handle the interface with incoming calls 34. An example of a telephone interface card includes the telephone interface card from Dialogic Corp. located in Massachusetts.

The telephony server 32 includes a call manager 62 which uses automated speech recognition tools to recognize the speech uttered by the user. Preferably, the tools include automatic speech recognition resources 64 as well as text-to-speech resources 66. Different speech engines are used based upon the application at hand. For example, one type of text-to-speech engine may be used when conversing with the user in French, while another engine is used with another user in English.

The call manager 62 determines whether a voice application is needed to service the request of the user. One or more voice pages (i.e., applications) are obtained and stored in a web proxy 67 located on the telephony server. The web proxy 67 may retrieve voice applications over the Internet and cache the voice applications in order to improve the performance of servicing the user's request. A VoiceXML interpreter 68 (i.e., a voice markup language engine) on the telephony server 32 executes the voice applications and may utilize one or more speech engines (64, 66) in order to interact with the user.

A uniform resource locator (URL) administrator 70 associates a telephone number with an Internet location (e.g., via a URL). For example, a user may have requested an individual's telephone number by dialing "1-555-1212" to obtain the information. The telephony server 32 associates this number with a predetermined URL which identifies a phone number lookup voice application. A remote dial server 72 provides an Internet telnet interface so that requests may be made to the call manager 62 for outbound dialing associated with a voice application. A remote dial server 72 is used for example to initiate an outbound call without receiving a corresponding triggering inbound call, such as when a user configures the present invention to issue the user a wake-up call for 6:00 a.m. the next morning.

FIG. 3 depicts the computer-implemented components that operate with the VoiceXML interpreter 68. As described above, the VoiceXML interpreter 68 on the telephony server 32 executes voice applications in order to interact with the user. The VoiceXML interpreter 68 determines whether a voice application is needed to service a request of a user. An embodiment of the present invention uses a voice markup language known in the speech industry as VoiceXML (Voice Extensible Markup Language). The VoiceXML interpreter 68 determines which VoiceXML application(s) can service the request of the remote user. The VoiceXML interpreter 68 communicates over an Internet connection 40 to locate suitable VoiceXML applications 90. If abnormal conditions are detected by the VoiceXML interpreter 68, then an E-mail module 92 sends electronic mail messages 48 to the appropriate personnel so that the abnormal conditions can analyzed and remedied if needed.

Figure 4:
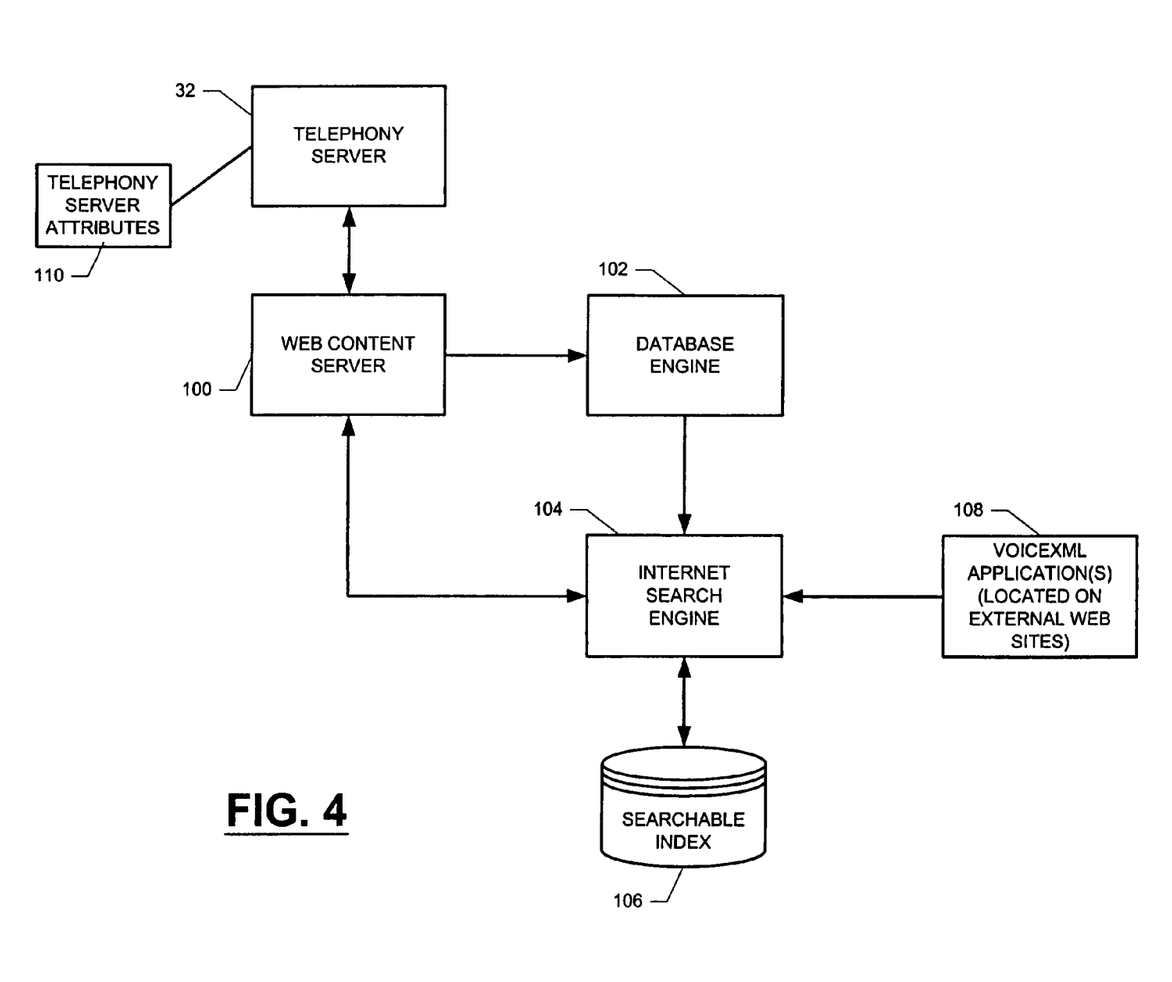
FIG. 4 is a block diagram that depicts a voice application retrieval web site used within the present invention.
Figure 5:
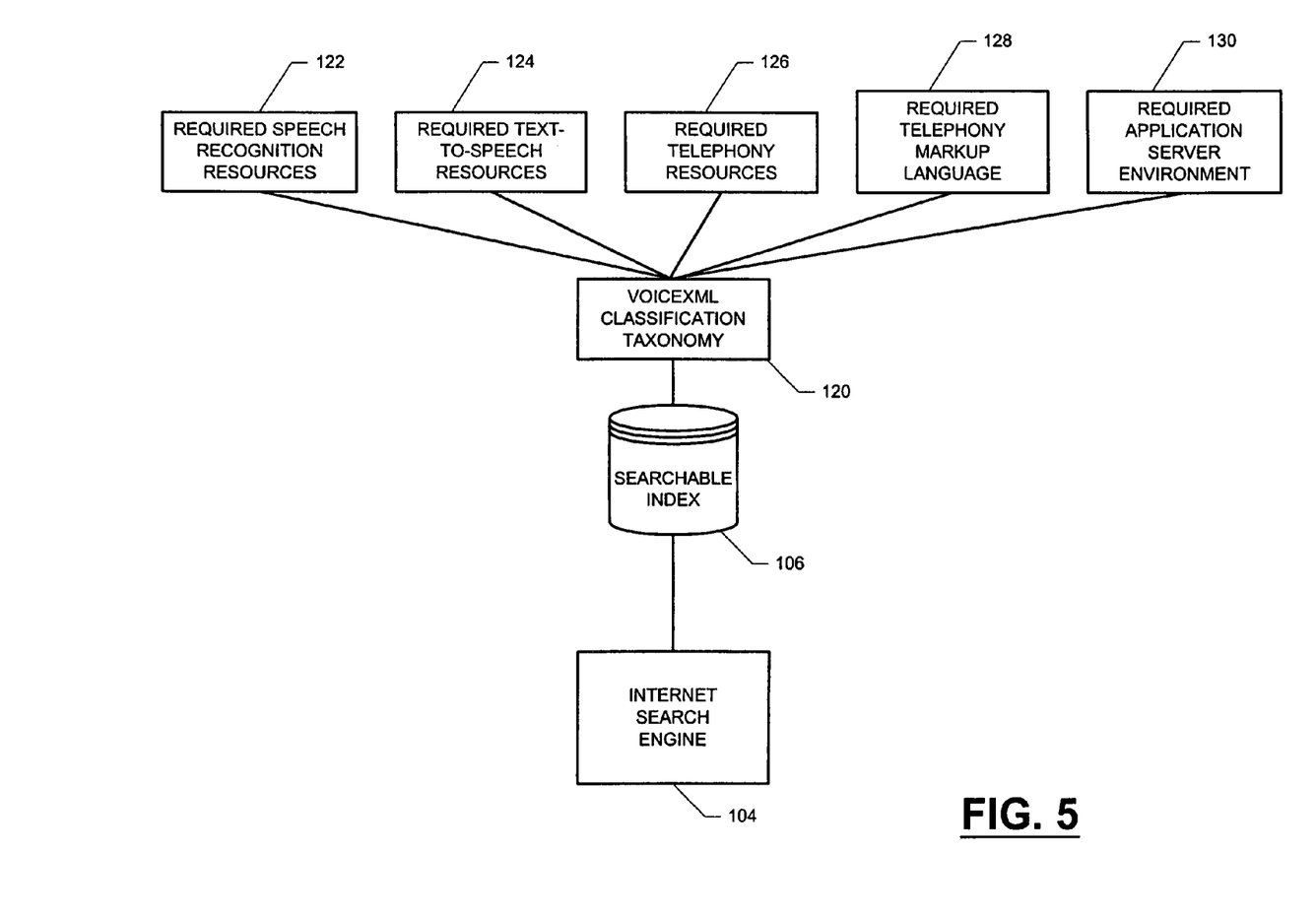
FIG. 5 is a data structure diagram that depicts the taxonomy data structure used by the voice application retrieval web site.
Figure 6:
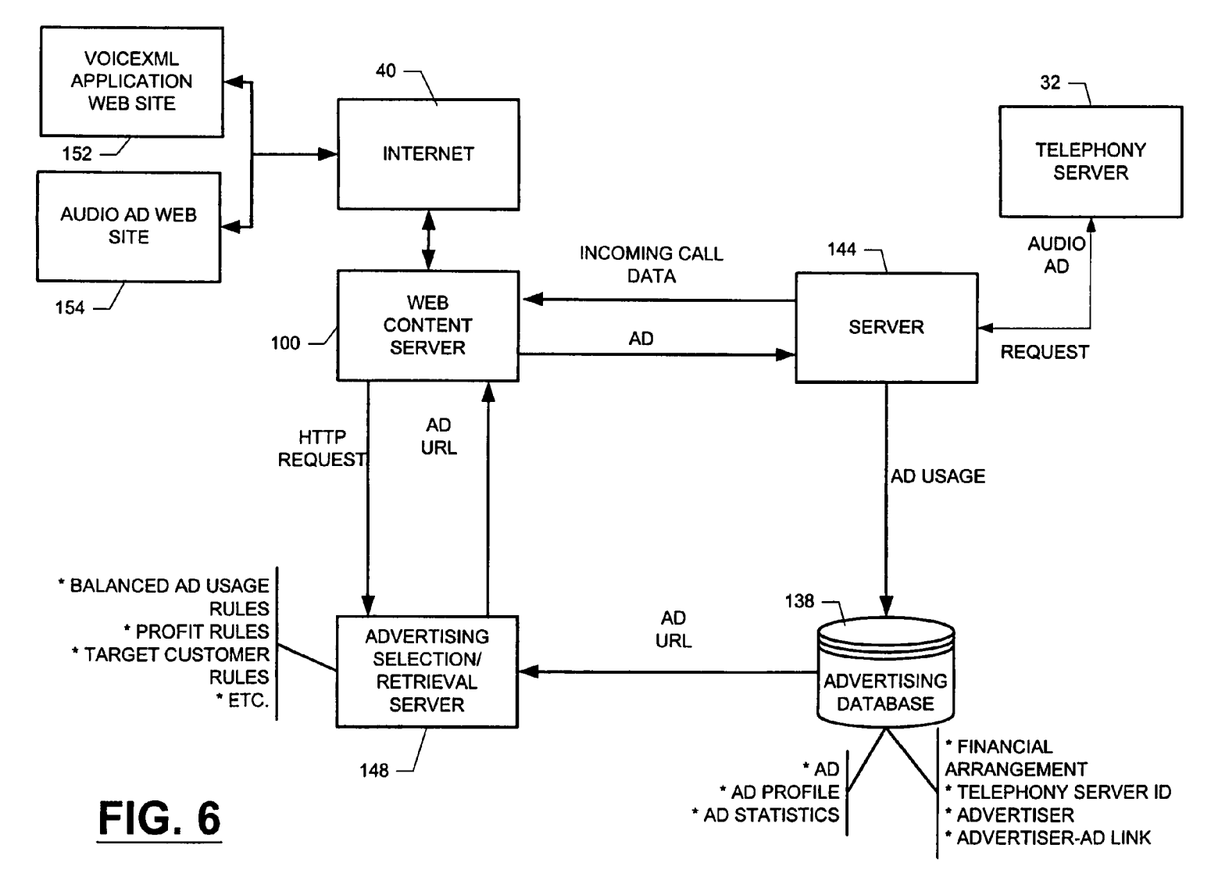
FIG. 6 is a block diagram that depicts an audio advertising system used within the present invention.

An embodiment of the present invention uses a remote web site to locate suitable VoiceXML applications 90. The remote web site may exact compensation for locating the suitable VoiceXML applications by having the user listen to an audio advertisement. FIGS. 4-6 describe below in greater detail the VoiceXML web site application retrieval system and the audio advertising system that are used within the present invention.

FIG. 4 is a system block diagram that depicts a voice application retrieval web site used within the present invention. Voice computer applications, such as VoiceXML applications, are indexed and catalogued. The voice applications are able to be searched using the index and linked into the telephony server. Once linked, the user has access via a wireless communication device to the services provided by the voice applications.

A user utilizes a communication device to access the user's telephony server 32. The present invention may be utilized by many different types of communication devices, such as a cellular communication device. The user may be accessing the telephony server 32 to have a service performed. A previously mentioned example of a service includes the telephony server 32 receiving a call from the user so that the user may locate a restaurant in a certain city. The telephony server 32 uses a web content server 100 to access a restaurant-locating voice application 108 that is on a network, such as the Internet. The voice application 108 may be a VoiceXML application located on a remote web site.

The telephony server 32 determines that a service is needed in order to process the request from the user. The telephony server 32 communicates to the web content server 100 the characteristics of the needed service. The web content server 100 locates a voice application 108 that can provide the needed service.

The web content server 100 communicates to a database engine 102 the characteristics of the needed service. The database engine 102 uses an Internet search engine 104 to search a voice application index database 106. The database 106 contains an index of voice applications that have been catalogued according to a taxonomy of the present invention. For example, the taxonomy includes indexing voice applications based upon what resources are required to operate each voice application.

The database engine 102 formulates search criteria to locate voice applications that can provide the needed service. The search criteria is formulated based upon the characteristics of the needed service. The characteristics include what type of application is needed, such as whether the telephony server needs a restaurant-locating voice application or some other voice application type. The search criteria also includes telephony server attributes 110. Telephony server attributes 110 describe the operating characteristics of the telephony server 32, such as what speech engines are able to operate on the telephony server 32.

The Internet search engine 104 uses the search criteria to determine which voice applications are suitable to fulfill the telephony server's request. When the location of at least one suitable voice application has been identified, the Internet search engine 104 retrieves the suitable voice application 108 over the Internet. The Internet search engine 104 then provides the voice application 108 to the telephony server 32 via the web content server 100. The telephony server 32 performs the functions of the voice application 108 in order to satisfy the request of the user 32.

FIG. 5 is a data structure diagram depicting the schema of the searchable index database 106. The index database 106 is structured according to a taxonomy 120 that classifies voice applications. The taxonomy 120 includes: a data structure 122 to store information about speech recognition resources required by the voice applications; a data structure 124 to store information about text-to-speech resources required by the voice applications; a data store 126 to store telephony resources required by the voice applications; a data structure 128 to store the version of the markup languages used by the voice applications; and a data structure 130 to store the application server environment information and licensing information of the voice applications. The schema of the index database 106 may be implemented in a relational database. However, it should be understood that the present invention is not limited to a relational database environment, but includes computer information storage schemes that permit the storage and retrieval of the voice application classification data.

With reference to FIG. 6, the advertising selection and retrieval computer system of the present invention ensures delivery of the audio ad to the user. The present invention retrieves audio ads from the advertising database 138 in response to an incoming call from the telephony server 32. A user may be using a telephone or a wireless communication device to communicate with the telephony server 32 to have a service performed for the user. An example of a service includes the telephony server 32 receiving a call from the user so that the user may locate a restaurant in a certain city. The telephony server 32 uses the web content server 100 to access a restaurant-locating software application that is on a network, such as the Internet 40. The application may be a VoiceXML application located on a remote web site 152. Another exemplary application includes a user calling to locate the phone number of another individual. In this latter example, the application is a phone number lookup VoiceXML application.

The telephony server 32 forwards the incoming call to a server 144 (which may be the server of the ISP) which forwards the call to a web content server 100. The web content server 100 formulates a hypertext transfer protocol (http) request for an audio ad. The request is sent to the advertising selection/retrieval server 148 for processing. The advertising selection/retrieval server 148 selects an appropriate audio ad from the advertising database 138 and sends back an ad location identifier to the web content server 100. The web content server 100 retrieves the audio file from a web site 154 based upon the ad location identifier and dynamically inserts the ad audio file into the VoiceXML application. The web content server sends the VoiceXML application back to the telephony server 32 so that the VoiceXML application may be executed. The audio file is also sent so that it may be played for the user of the telephony server 32.

The web content server 100 may include in the http request such information as the type of user that is placing the incoming call. The web content server 100 knows what type of user is placing the incoming call based upon information that the user has already provided to the telephony server 32. For example, the telephony server 32 may know where the user is located based upon the area code of the incoming call or the telephony server 32 has a database that stores profiles of its users. The user's request may also furnish additional information. For example, if the user is requesting jewelry information, then the web content server 100 may supplement the http request with that profile information. In such a situation, the advertising selection/retrieval server 148 may heighten the probability that a jewelry-related audio ad be selected. The telephony server 32 may also have asked the user questions about the user's profile.

The advertising selection/retrieval server 148 selects an audio ad based upon certain predetermined rules. The ad selection rules include: balanced ad usage rules, profit rules (e.g., revenue sharing rules), target user/customer profile rules, and other selection rules that will be apparent to one skilled in the art. The balanced ad usage rules ensure that audio ads are played at least a certain amount of times. The profit rules optimize the amount of earnings the operators of the present invention acquire for the playing of the audio ads. For example, the profit rules may indicate that a first audio ad be played more often than a second audio ad when the first audio ad's financial arrangement is based upon a profit-sharing arrangement, and the second audio ad's financial arrangement is a set fee arrangement. The target user profile rules ensure that audio ads that fit a user profile are played. For example, a jewelry-related audio ad is played for a user who has requested jewelry-related information. Examples of other selection rules include accounting information (such as whether the advertiser is current in its payments to the operators), application service provider configuration, and content provider configuration.

The telephony server 32 provides ad usage data which is stored in the advertising database. The telephony server 32 records how long an audio ad was played to the user. The user may terminate the call before the entire audio ad was played. The ad usage information is sent to advertisers to provide feedback on the quality of their ads. For example, if a certain ad is habitually terminated early by users, then this serves as an indication that the ad may need to be improved or replaced.

The present invention operates with free content providers. In this context, the system of the present invention is entitled to a certain number of minutes (i.e., four minutes) of its own ad for every time slot (e.g., twenty-two minutes) while the application service provider provides a piece of time for its own ad. In other words, for every block of time, say thirty minutes, the content provider can use only twenty-two minutes of that time block while keeping the remaining four minutes for its own ad and four minutes for the application service provider.

The present invention includes a revenue sharing system. The hosting company who owns the advertising servers charges a one time listing fee and monthly platform usage fees from advertising agencies and telephony server operators. The advertising agencies pay the hosting company with the listing fee and monthly platform fee, and pay the server operators (i.e., the ISPs) the ad usage fee.

The server operators pay the hosting company the listing and monthly platform fees and receive the ad usage fees from matched advertisers. The server operators distribute the ad fees with the connected application providers, and charge the application providers the application usage/listing fees.

Figure 7:
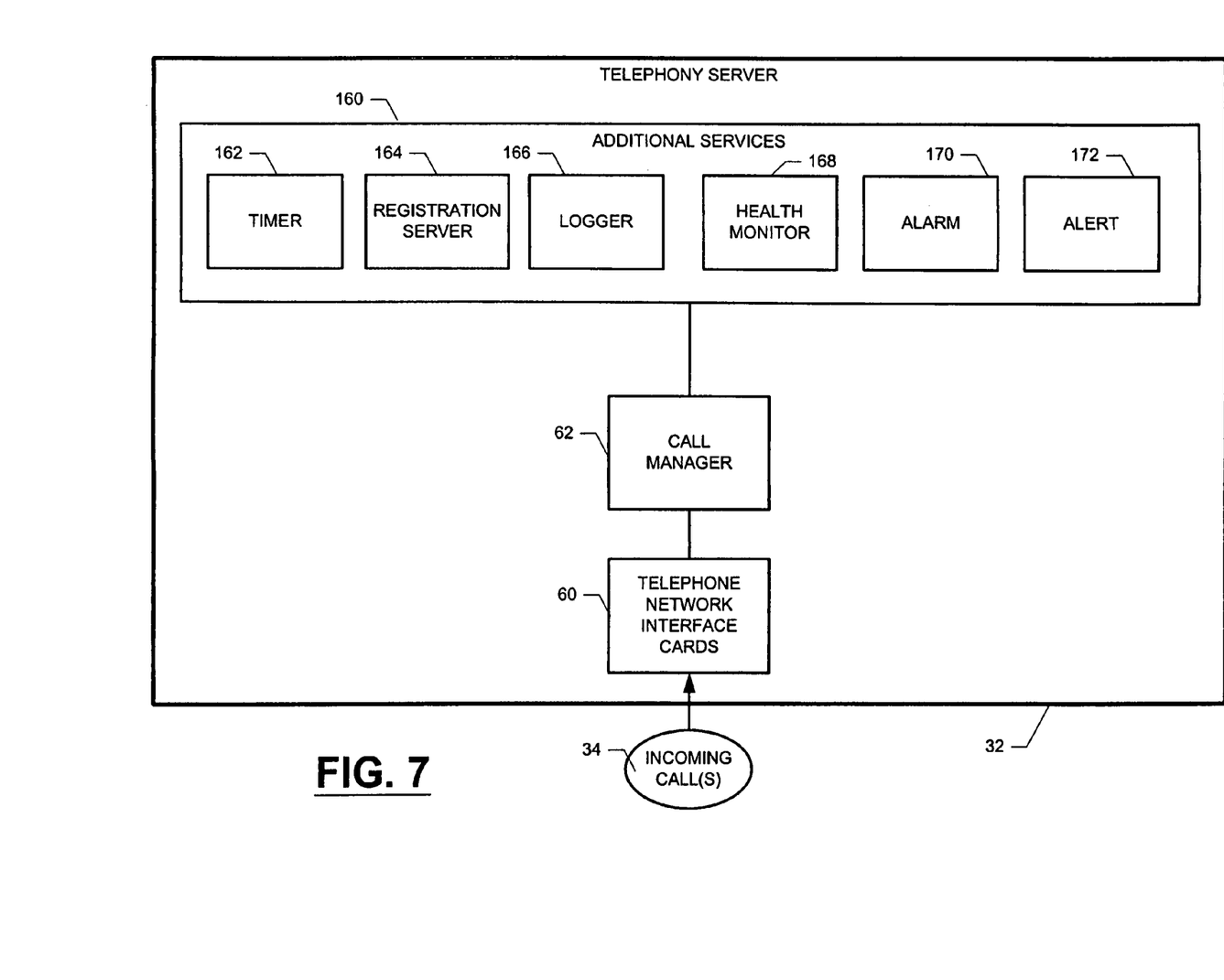
FIG. 7 is a block diagram that depicts additional operations of the call manager of the present invention.

FIG. 7 is a block diagram that depicts additional services 160 of the call manager 62 of the present invention. A timer 162 provides timer services to VoiceXML applications. For example, a VoiceXML application may use the timer 162 to determine when the user does not provide a response within a predetermined amount of time.

Registration server 164 registers the telephony processes that are responsible for executing VoiceXML applications. Logger 166 is a centralized logging mechanism that records debug, warning, and error messages as well as detailed call information from VoiceXML applications. Health monitor 168 monitors the VoiceXML applications by sending out periodic messages. The Health monitor 168 also includes a telnet interface which allows users or scripts to perform monitoring, maintenance, or administrative tasks.

The alarm 170 acts as an interface to the sentry alarm board for various physical conditions of the system, such as voltage and temperature. The alert module 172 takes appropriate actions for system problems, including phone calls, paging, and sending electronic mail messages so that the abnormal conditions can analyzed and remedied if needed.

Figure 8:
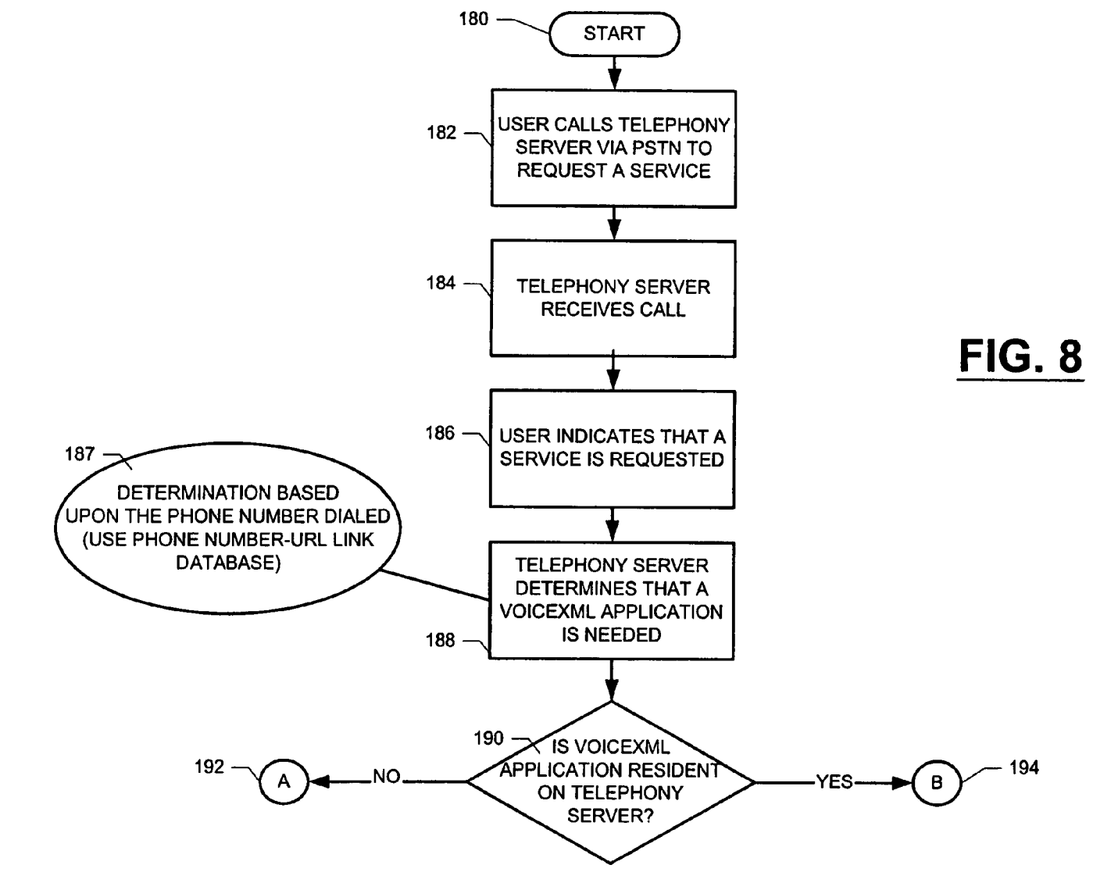
FIGS. 8-12 are flowcharts that depict the operational steps of the present invention for processing calls from users.

FIGS. 8-12 are flowcharts that depict the operational steps of the present invention in processing a call from a user. With reference to FIG. 8, start indication block 180 indicates that process block 182 is performed wherein a user calls the user's telephony server over a PSTN connection in order to request a service (such as a restaurant location service). At process block 184, the telephony server receives the call.

At process block 186, the user indicates the service that is desired. At process block 188, the telephony server determines that a VoiceXML application is needed in order to provide the service. An embodiment of the present invention includes determining what VoiceXML application to use based upon the phone number dialed by the user as shown at reference numeral 187. For example, a user may have requested an individual's telephone number and dialed "1-555-1212" to obtain the information. The telephony server associates this number with a predetermined URL which contains a phone number lookup voice application. A phone number-URL link database may be used to retrieve a web page URL based upon a dialed phone number, and the web page at the URL will perform the service.

Decision block 190 examines whether the VoiceL application is resident on the telephony server. If it is resident, then processing continues on FIG. 11 at process block 220. It should be understood that the present invention does not typically retain VoiceXML applications on the telephony server and retrieves VoiceXML applications in real-time in order to satisfy a present need. When the VoiceXML application is not resident on the telephony server, then processing continues on FIG. 9 at process block 200.

Figure 9:
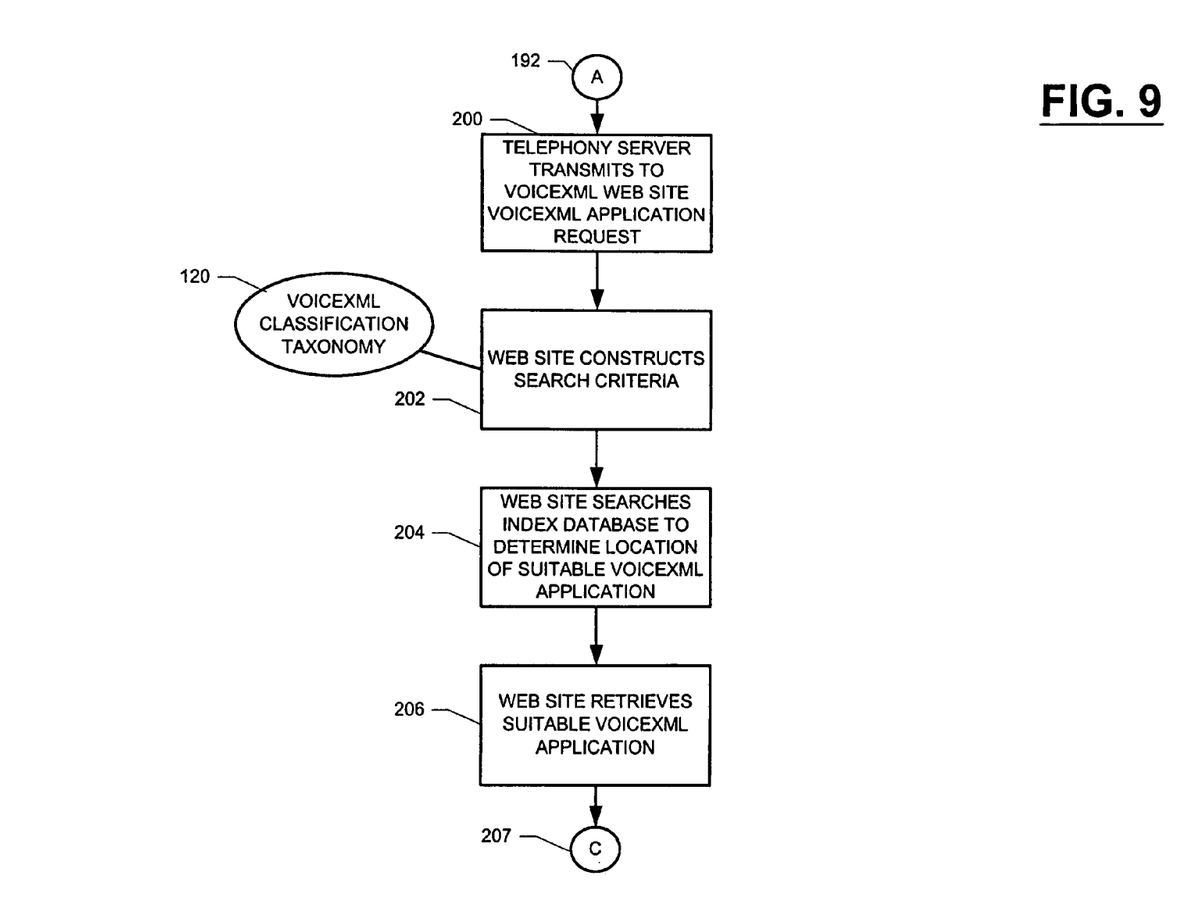

With reference to FIG. 9, the telephony server transmits to the VoiceXML application retrieval web site a VoiceXML application request at process block 200. The request contains search criteria so that the web site may search its database according to its VoiceXML classification taxonomy 120. Process block 202 constructs the search criteria in accordance with the VoiceXML classification taxonomy 120. The search criteria may for example contain the attributes of the telephony server (such as what speech engines operate upon the telephony server), the type of service requested, and other such criteria to retrieve a suitable voice application.

The search is performed at process block 204 in order to determine the location of a suitable VoiceXML application. Process block 206 retrieves a suitable VoiceXML application. Continuation block 207 indicates that processing continues on FIG. 10.

Figure 10:
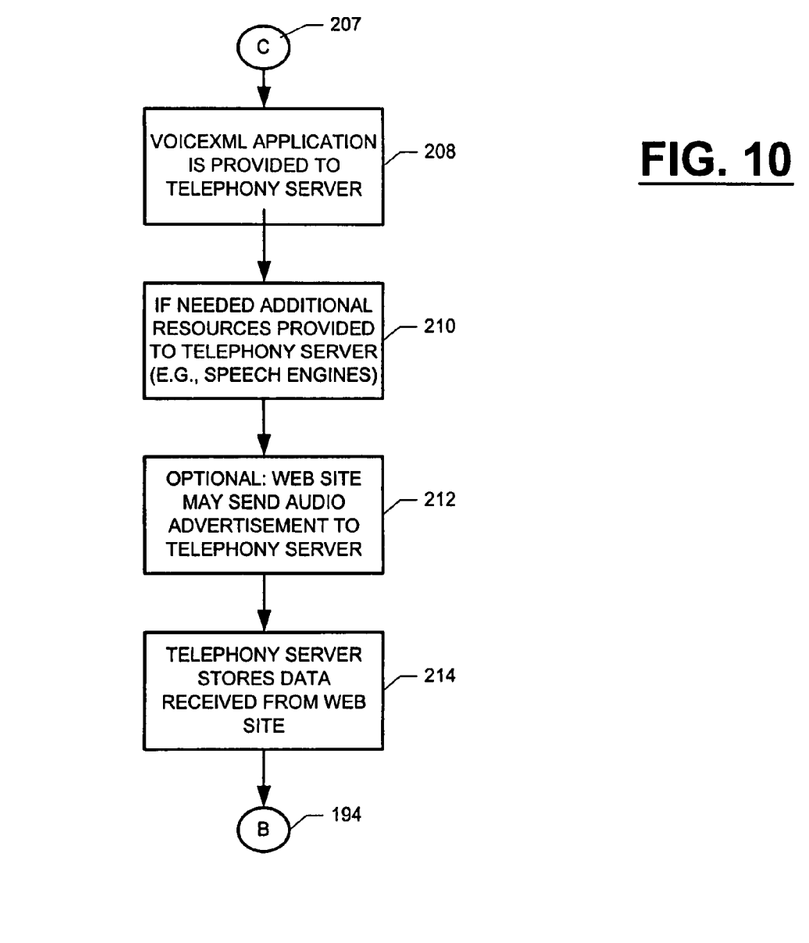

With reference to FIG. 10, the VoiceXML application is provided to the telephony server at process block 208. Additional resources (if needed) are provided at process block 210 to the telephony server (e.g., speech engines) in order to operate the VoiceXML application. At process block 212, the web site may send an audio advertisement to the telephony server. The audio advertisement sent to the telephony server may have been selected based upon the profile of the user using the telephony server. The telephony server stores the data (e.g., the VoiceXML application and audio advertisement) on its storage medium (e.g., its random access memory, hard drive, etc.). Processing continues on FIG. 11 at process block 220.

Figure 11:
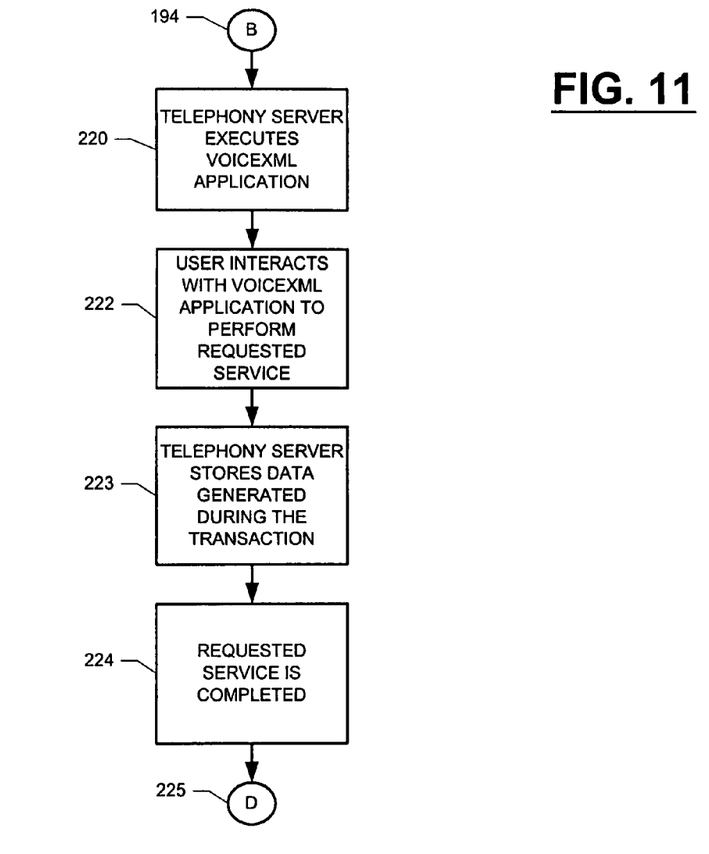

With reference to FIG. 11, the telephony server executes the VoiceXML application at process block 220. At process block 222, the user interacts with the VoiceXML application so that the requested service may be performed. At process block 223, the telephony server temporarily stores the data generated during the transaction. The requested service is completed at process block 224. Processing continues on FIG. 12 at process block 226.

Figure 12:
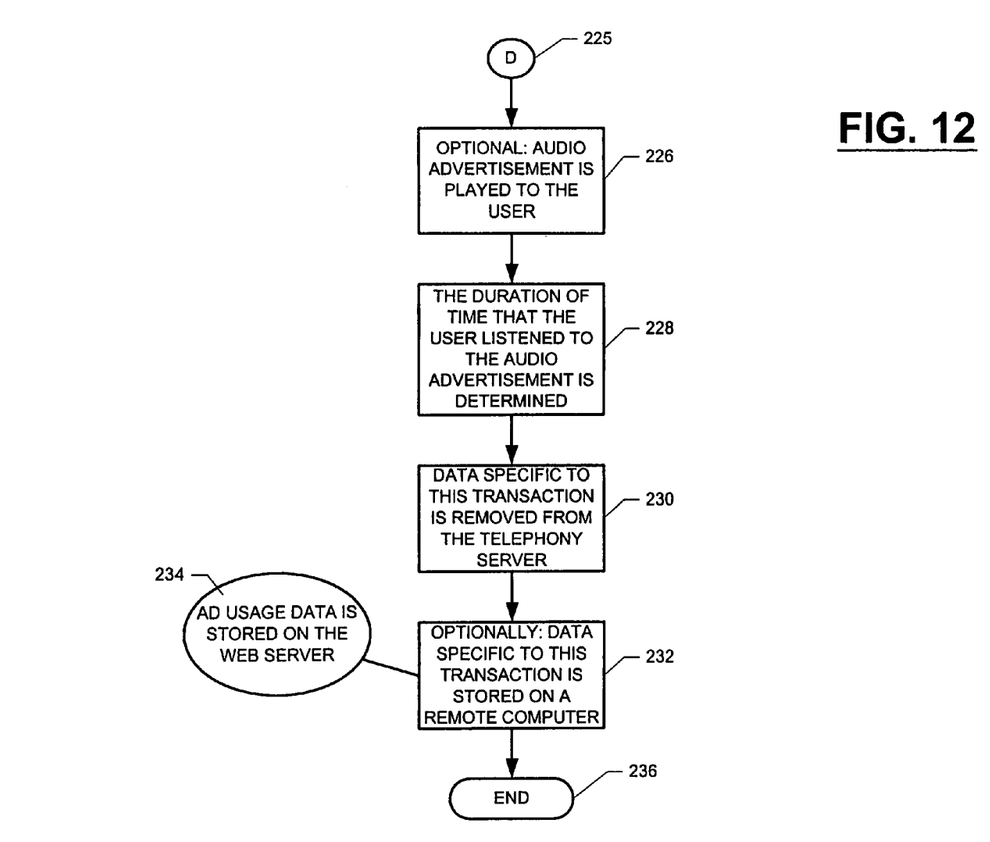

With reference to FIG. 12, if an audio advertisement had been sent, then the audio advertisement is played to the user at process block 226. Process block 228 determines the duration of time that the user listened to the audio advertisement. Process block 230 removes data that is specific to the transaction from the telephony server. This enables the telephony server to be essentially stateless after handling a transaction. Process block 232 sends the specific transactional data from the telephony server to a remote computer, such as the remote web content server. This may include sending the ad usage data 234 from the telephony server to the remote web site which stores the ad usage data in its database. Processing terminates at end block 236.

The preferred embodiment described with reference to the drawing figures is presented only to demonstrate an example of the invention. Additional and/or alternative embodiments of the invention would be apparent to one of ordinary skill in the art upon reading this disclosure.

It is claimed:

1. A computer-implemented method for a telephony server to provide services based upon a call from a user, comprising the steps of:
   receiving an incoming call from a user;
   using a first voice application, conducting a speech-based conversation with the user, obtaining a request for service;
   based on the request for service, retrieving over a computer network a second voice application from a remote web site;
   using the retrieved voice application to perform the requested service; and
   after performing the requested service, removing the retrieved voice application and the service request from the telephony server.

\* \* \* \* \*

UNITED STATES PATENT AND TRADEMARK OFFICE
CERTIFICATE OF CORRECTION

| | | |
|---|---|---|
| PATENT NO. | : 7,558,252 B2 | Page 1 of 1 |
| APPLICATION NO. | : 11/366122 | |
| DATED | : July 7, 2009 | |
| INVENTOR(S) | : Liang Shen et al. | |

It is certified that error appears in the above-identified patent and that said Letters Patent is hereby corrected as shown below:

On the Title Page:

Please insert item (60) Related Application Data as follows:

-- Related U.S. Application Data
(60) Continuation of Application No. 09/759,931, filed January 12, 2001, now U.S. Patent No. 7,072,328. --

In the Specification:

Below the title please insert the CROSS-REFERENCE TO RELATED APPLICATION as follows:

-- CROSS-REFERENCE TO RELATED APPLICATION
The present application is a continuation of Application No. 09/759,931, filed January 12, 2001, now U.S. Patent No. 7,072,328. --

Signed and Sealed this
Twenty-fourth Day of June, 2014

Michelle K. Lee
*Deputy Director of the United States Patent and Trademark Office*